(12) United States Patent
Gibbs et al.

(10) Patent No.: US 11,995,771 B2
(45) Date of Patent: May 28, 2024

(54) AUTOMATED WEIGHTING GENERATION FOR THREE-DIMENSIONAL MODELS

(71) Applicant: University of Georgia Research Foundation, Inc., Athens, GA (US)

(72) Inventors: John L. Gibbs, Athens, GA (US); Benjamin Robert Flanders, Tucker, GA (US); Dylan Scott Pozorski, Watertown, WI (US)

(73) Assignee: UNIVERSITY OF GEORGIA RESEARCH FOUNDATION, INC., Athens, GA (US)

( * ) Notice: Subject to any disclaimer, the term of this patent is extended or adjusted under 35 U.S.C. 154(b) by 159 days.

(21) Appl. No.: 17/842,112

(22) Filed: Jun. 16, 2022

(65) Prior Publication Data

US 2022/0406016 A1     Dec. 22, 2022

Related U.S. Application Data

(60) Provisional application No. 63/211,620, filed on Jun. 17, 2021.

(51) Int. Cl.
    *G06T 17/20*          (2006.01)
    *G06N 3/04*           (2023.01)
    *G06T 19/20*          (2011.01)

(52) U.S. Cl.
    CPC ............ *G06T 17/205* (2013.01); *G06N 3/04* (2013.01); *G06T 19/20* (2013.01); *G06T 2219/2016* (2013.01)

(58) Field of Classification Search
    CPC .................. G06T 17/205; G06T 19/20; G06T 2219/2016; G06T 13/40; G06T 17/20; G06N 3/04; G06N 3/0464
See application file for complete search history.

(56) References Cited

U.S. PATENT DOCUMENTS

| | | | |
|---|---|---|---|
| 2021/0150806 A1* | 5/2021 | Guler | ................. G06T 13/40 |
| 2023/0214458 A1* | 7/2023 | Marsden | .............. G06V 40/11 |
| | | | 382/157 |

FOREIGN PATENT DOCUMENTS

| | | |
|---|---|---|
| JP | 2019112117 A * | 7/2019 |
| JP | 2020204892 A * | 12/2020 |

* cited by examiner

*Primary Examiner* — Motilewa Good-Johnson
(74) *Attorney, Agent, or Firm* — Thomas Horstemeyer, LLP

(57) ABSTRACT

Disclosed are various approaches for automatically assigning weights to vertices of a skin or mesh that control how said vertices in the 3D model move under the influence of skeletal rotation and translation. A computing device can receive a first model weightings matrix. Next, the computing device can include adjusting the number of rows in the first model weightings matrix to generate an adjusted model weightings matrix with a number of rows that matches an input number of rows for a machine-learning model, each row in the adjusted model weightings matrix representing a vertex of a mesh applied to a three-dimensional model. Then, the computing device can apply the machine learning model to the adjusted model weightings matrix, to generate an output polygonal mesh model weightings matrix. Subsequently, the computing device can generate a second polygonal mesh model weightings matrix by adjusting the number of rows of the machine learning model output weightings matrix to match the number of rows of the initial polygonal mesh model weightings matrix.

15 Claims, 2 Drawing Sheets

AUTOMATED WEIGHTING GENERATION FOR THREE-DIMENSIONAL MODELS

CROSS-REFERENCE TO RELATED APPLICATIONS

This application claims priority to, and the benefit of, U.S. Provisional Patent Application No. 63/211,620, filed on Jun. 17, 2021 and entitled "AUTOMATED WEIGHTING GENERATION FOR THREE-DIMENSIONAL MODELS," which is incorporated by reference as if set forth herein in its entirety.

BACKGROUND

Animating three-dimensional (3D) figures generally includes properly configuring two distinct and interrelated components of the model. The first of these components can include a wireframe, or polygonal mesh, and the second can include a skeletal structure, co-located within or near the mesh, and which controls the motion of the mesh. The mesh can be thought of as a set of vertices that are each influenced by the bones of the skeleton according to some weight value. Depending on this weighting, rotations and translations of the skeletal joints will drive changes to the positions of the mesh's vertices.

Because 3D wireframe models may contain tens or hundreds of thousands of vertices, it can be impractical to manually weight each vertex with respect to each bone of the skeleton. Accordingly, several 3D animation programs include features to automatically weight the vertices of a wireframe mesh for the skeleton of the 3D model. Unfortunately, the resulting weights generated by these animation programs for the individual vertices usually result in visually unacceptable weightings. It is common for the vertex weights that are automatically generated for the wireframe mesh by these animation programs to cause the wireframe skin to deform in unnatural ways when the individual bones of the skeleton move during animation. As an example, moving an arm of the skeleton could cause the skin on the chest or back of the three-dimensional model to deform in unnatural ways.

Trained technicians, known as technical animators, are presently required to alter the automatically generated vertex weights into a form that is acceptable for the purposes of animation. As an example, a technical animator could alter the vertex weights such that moving an arm of the skeleton no longer causes the skin of the chest or back of the model to deform in unnatural ways. This manual reweighting process is tedious and takes a long period of time to complete.

Accordingly, there exists a need to improve the process of assigning weightings to vertices of a mesh applied to the skeleton of a 3D model.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for automatically assigning weights to vertices of a wireframe skin or mesh that control how said vertices in the 3D model move under the influence of skeletal rotation and translation. Using the various embodiments of the present disclosure, weights can be assigned to the vertices in an automated manner using one or more machine-learning models. The machine-learning model is able to analyze and assign weights to produce more realistic deformations of 3D models by taking into consideration the weights applied to properly skinned 3D models used as training data for the machine-learning model.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principles disclosed by the following illustrative examples.

Figure 1:
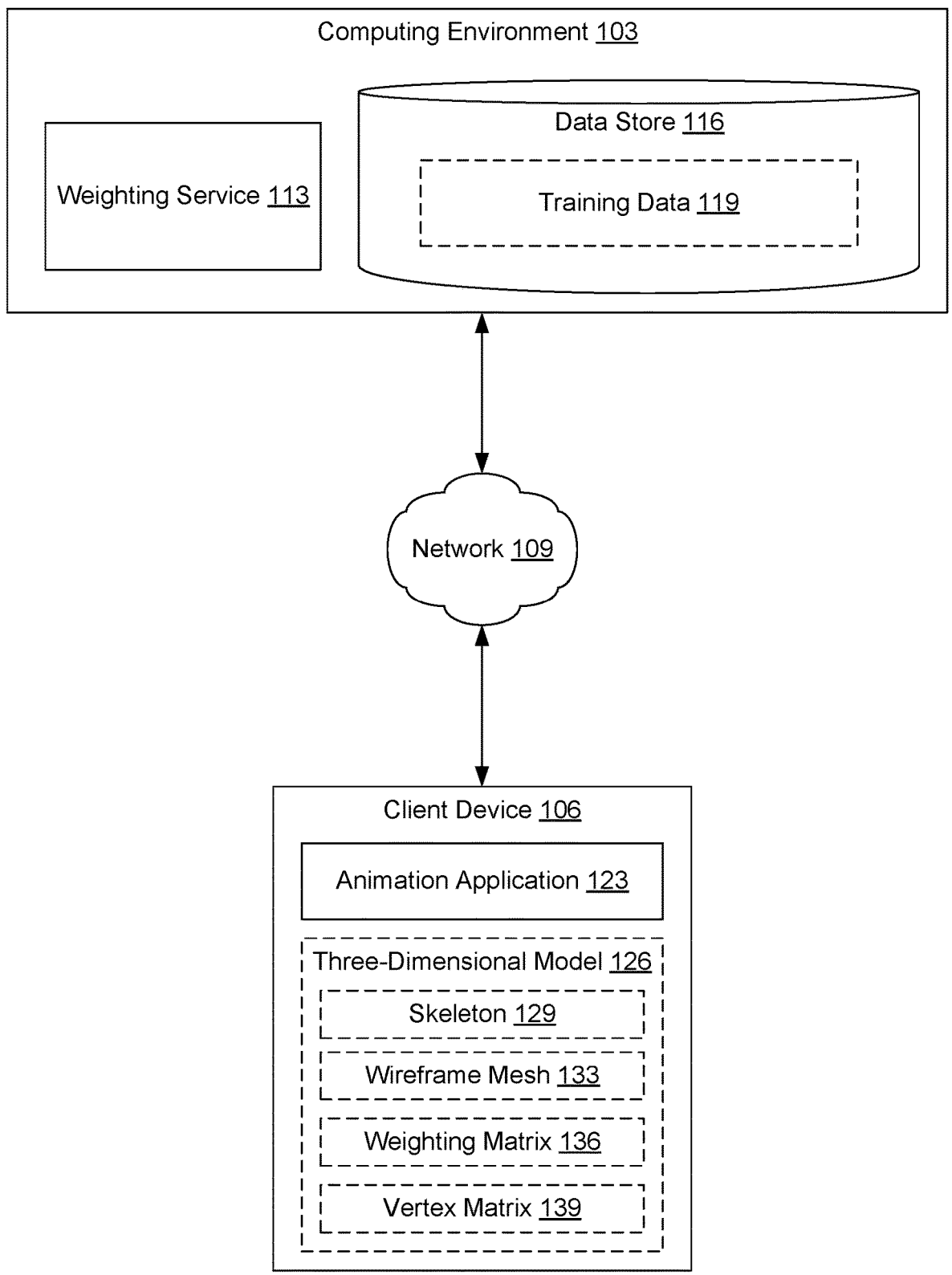
FIG. 1 is a drawing of a network environment according to various embodiments of the present disclosure.

With reference to FIG. 1, shown is a network environment 100 according to various embodiments. The network environment 100 can include a computing environment 103 and a client device 106, which can be in data communication with each other via a network 109.

The network 109 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 109 can also include a combination of two or more networks 109. Examples of networks 109 can include the Internet, intranets, extranets, virtual private networks (VPNs), and similar networks.

The computing environment 103 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the computing environment 103 can employ a plurality of computing devices that can be arranged in one or more server banks or computer banks or other arrangements. Such computing devices can be located in a single installation or can be distributed among many different geographical locations. For example, the computing environment 103 can include a plurality of computing devices that together can include a hosted computing resource, a grid computing resource or any other distributed computing arrangement. In some cases, the computing environment 103 can correspond to an elastic computing resource where the allotted capacity of processing, network, storage, or other computing-related resources can vary over time.

Various applications or other functionality can be executed in the computing environment 103. The components executed on the computing environment 103 include a weighting service 113, and other applications, services, processes, systems, engines, or functionality not discussed in detail herein.

Also, various data is stored in a data store 116 that is accessible to the computing environment 103. The data store 116 can be representative of a plurality of data stores 116, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the data store 116 is associated with the operation of the various applications or functional entities described below. This data can include training data 119, and potentially other data.

The training data 119 can represent a collection of weighting matrices that have been used to train the machine-learning model relied upon by the weighting service 113. Each weighting matrix can represent a series of columns, each column of which represents a structural member of a three-dimensional model, such as a bone. Each row in the weighting matrix can represent a vertex of a wireframe mesh, sometimes referred to as a skin, applied to the skeleton of the three-dimensional model. However, in some implementations, each column could represent a vertex of a wireframe mesh, while each row could represent a structural member of a three-dimensional model, such as a bone. The training data can optionally include a collection of vertex coordinates with a row ordering identical to the row ordering of the weightings matrix. The columns of the vertex matrix correspond to the x, y, and z coordinate space values for a given vertex. Coordinate space values are derived from the same 3d model that the weighting matrix is derived from.

The value of each cell in the weighting matrix can represent the intensity of the relationship between the vertex (as identified by the row) and the structural member (as identified by the column). A lower value for the cell (e.g., at or near zero) indicates that the vertex would not move, or would minimally move, in response to a movement of the respective structural member of the three-dimensional model. Meanwhile, an increasingly large value for the cell indicates an increasing degree of movement of the vertex in response to a movement of the respective structural member of the three-dimensional model. The maximum value of a cell is generally 1.0, which corresponds to a 100% vertex movement in response to a bone deformation, while the minimum value of a cell is generally 0.0, which indicates no relation between a bone and a vertex.

The training data 119 can be generated through a variety of approaches. For example, each weighting matrix in the training data 119 could be manually generated by a technical animator assigning values to individual vertices by hand. As another example, the weighting matrices could be automatically generated according to various rules or pre-specified parameters.

The weighting service 113 can be executed to receive, generate or edit a weighting matrix 136 for a three-dimensional model 126 according to a machine-learning model trained using the training data 119. Various machine-learning models may be used according to various embodiments of the present disclosure, such as convolutional neural networks, recurrent neural networks, decision trees, etc. The client device 106 is representative of a plurality of client devices that can be coupled to the network 109. The client device 106 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 106 can include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the client device 106 or can be connected to the client device 106 through a wired or wireless connection.

The client device 106 can be configured to execute various applications such as an animation application 123. The animation application 123 can be executed to generate and edit three-dimensional assets for use in animated videos, games, virtual reality (VR), augmented reality (AR), etc. This can include creating, editing, and animating three-dimensional models 126.

The three-dimensional model 126 represents a three-dimensional asset that can be manipulated for use as an animation in video, game, VR, AR, etc. Generally, a three-dimensional model 126 will include a number of components, such as a skeleton 129, a wireframe mesh 133, a weighting matrix 136, and a vertex matrix 139.

The skeleton 129 can define a collection of individual structural members, and their relative positions to and connections with each other. Each structural member may be referred to as a bone or joint. Movement of the individual structural members of the skeleton 129 can be used to give the three-dimensional model 126 the appearance of movement.

The wireframe mesh 133 is used to provide visual features and textures to the surface or exterior of three-dimensional models. The wireframe mesh 133 can include a plurality of vertices which represent the spatial boundaries of the wireframe mesh 133. Movements of the structural members of the skeleton 129 of the three-dimensional model 126 can cause corresponding movements of or changes in the wireframe mesh 133.

The weighting matrix 136 represents an encoding of the relationship between individual vertices of the wireframe mesh 133 and individual structural members of the skeleton 129. Each column in the weighting matrix 136 can represent an individual structural member of the skeleton 129, and each row in the weighting matrix 136 can represent an individual vertex of the wireframe mesh 133 of the three-dimensional model 126. However, some implementations could do the reverse, whereby columns represent vertices and rows represent structural members. Each cell in the matrix can represent the intensity of the relationship between a particular structural member of the skeleton 129 and a particular vertex of the wireframe mesh 133. A lower value for the cell (e.g., at or near zero) indicates that the vertex would not move, or would minimally move, in response to a movement of the respective structural member of the skeleton 129 of the three-dimensional model 126. Meanwhile, an increasingly large value for the cell indicates an increasing degree of movement of the vertex in response to a movement of the respective structural member of the skeleton 129 of the three-dimensional model 126, with a value of 1.0 indicating a 100% motion relationship between the structural member and the vertex.

The vertex matrix 139 can represent a matrix that stores the geometric location of individual vertices of the wireframe mesh 133. For example, the vertex matrix 139 could store a set of three-dimensional coordinates (e.g., an x, y, and z coordinate) for each vertex of the wireframe mesh 133. However, other coordinate systems could also be used in the various embodiments of the present disclosure.

Although the network environment 100 is provided as an example implementation, it should be noted that some or all of the described components could be executed on the same computer. For example, given a sufficiently powerful workstation acting as a client device 106, all of the components previously described could be executed on the same client device 106.

Figure 2:
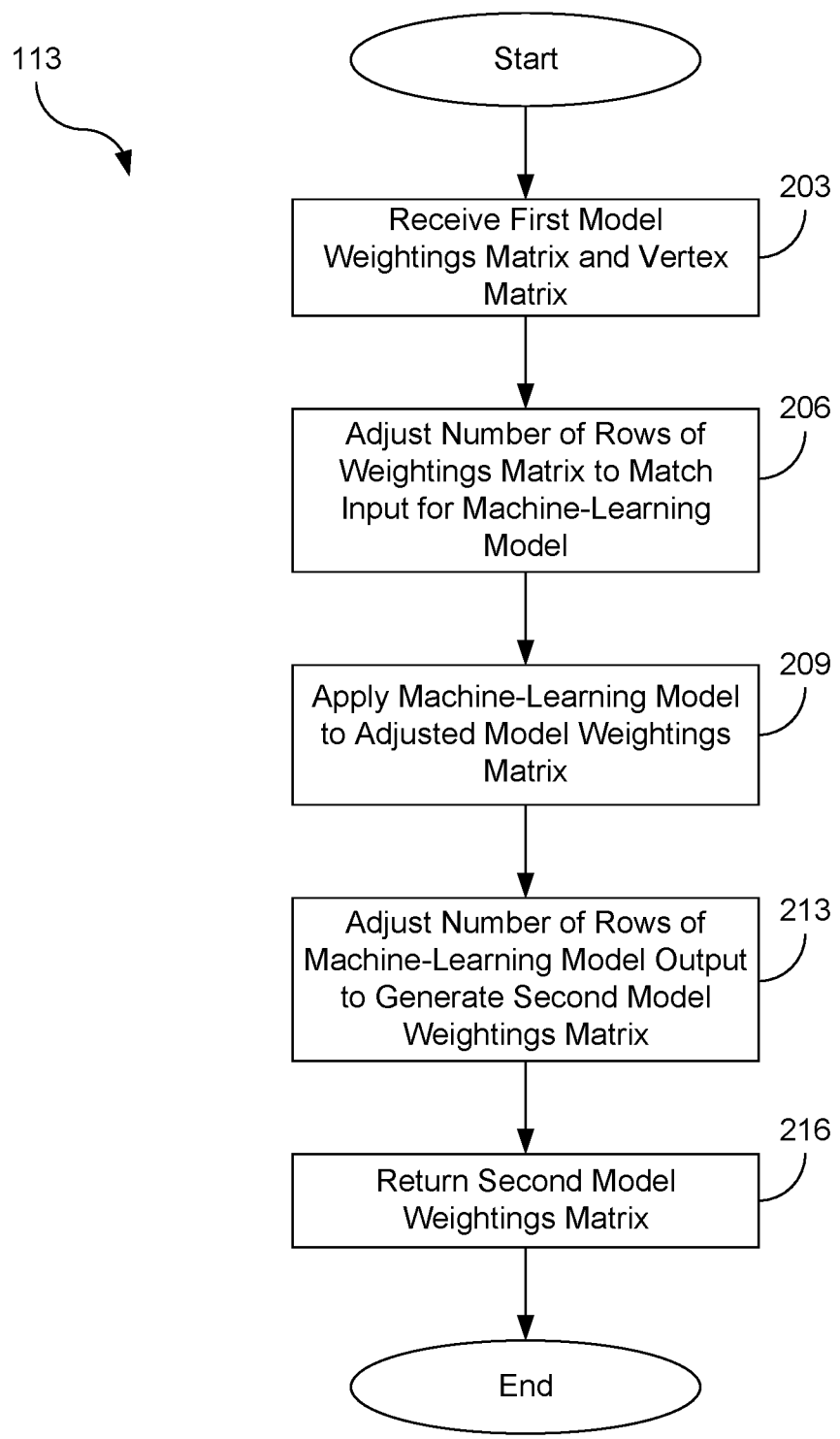
FIG. 2 is a flowchart illustrating one example of functionality implemented as portions of an application executed in a computing environment in the network environment of FIG. 1 according to various embodiments of the present disclosure.

Referring next to FIG. 2, shown is a flowchart that provides one example of the operation of a portion of the weightings service 113. The flowchart of FIG. 2 provides merely an example of the many different types of functional arrangements that can be employed to implement the operation of the depicted portion of the weightings service 116. As an alternative, the flowchart of FIG. 2 can be viewed as depicting an example of elements of a method implemented within the network environment 100.

Beginning with block 203, the weightings service 113 can receive a first weightings matrix 136 for a three-dimensional model 126 and a vertex matrix for the three-dimensional model 126. For example, the weightings service 113 could receive the weightings matrix 136 and the vertex matrix 139 from the animation application 123 in response to a user interaction with the animation application 123. For instance, if a plug-in or module were installed in the animation application 123, the user could use the plug-in or module to export and send the weightings matrix 136 and the vertex matrix 139 to the weightings service 113. In these implementations, the plug-in or module could convert the data from a native format (e.g., a MAYA® XML file) into the weightings matrix 136 provided to (and therefore received by) the weightings service 113. The plug-in module could separately determine the geometric location of each vertex of the three-dimensional model 126 and save them to the vertex matrix 139 provided to the weightings service 113.

Then, at block 206, the weightings service 113 can preprocess the weightings matrix 136 for use by the machine-learning model to generate an adjusted weightings matrix. For example, the machine-learning model may be configured to interact with a weightings matrix 136 with a predefined number of rows representing a predefined or standardized number of vertices. However, the weightings matrix 136 received at block 203 could have additional or fewer rows than the machine-learning model is configured to process. Accordingly, the weightings service 113 could add rows or remove rows as needed in order to be able to process the weightings matrix 136 using the machine-learning model. These rows, and their respective values, may be added or removed using various approaches, such as the nearest neighbor algorithm. The respective intensity values could also be expanded from Maya's default range of [0, 1] to [−1, 1] in order to improve precision and compatibility with common neural network activation functions, such as 'LeakyReLu.' One example of a formula that could be used for conversion of each intensity value is new_value=(old_value*2.0)−1.0.

Next, at block 209, the weightings service 113 can then utilize or apply a machine-learning model to the adjusted weightings matrix generated at block 206 and geometric information from Block 203. In addition, the coordinate location vertex matrix (the Vertex Matrix) can be processed through a series of Neural Network layers to reduce the number of inputs from the original number of vertex mesh points to some predefined encoded version of itself. The weighting and vertex matrices can be concatenated together to provide simultaneous information concerning weight values and locations. The Weighting Matrix and Vertex Matrix concatenation can be manipulated further via the machine-learning model. For example, the weightings service 113 could apply a convolutional neural network to the adjusted weightings matrix to generate an output weightings matrix. The weightings service could also apply a convolutional layer and global average pooling layer to the vertex matrix to ensure this output is the same size as the weight matrix convolution output. Then, these two values could be concatenated together and passed through more convolution layers. A global max pooling layer could also be used in place of a global average pooling layer. In these examples, each column of the adjusted weightings matrix could be supplied as a separate input to the convolutional neural network. This allows for the convolutional neural network to individually process each structural member of the skeleton 129 of the three-dimensional model 126 using one-dimensional convolutional layers, which may sometimes be referred to as convolutional kernels. Additionally, only coordinate information about the vertices that are used by this singular bone could be included in the vertex matrix. This would limit the amount of unused input data and could allow for quicker neural network training. However, other approaches could also be used according to various embodiments of the present disclosure.

In the case of supplying individual skeleton members as input to a neural network, a secondary input value can be supplied that identifies the type of skeleton member that the weight map input corresponds to. This method of input encoding, known as one-hot encoding, associates each bone type with a unique array of bits. A singular 'true' value is located in a unique index for that bone type and all other values are of the bit array are 'false.' Another internal neural network functionality can be to apply additive zero-centered gaussian noise to all training input data to reduce overfitting. Neural network weights can be initialized according to a Random uniform distribution in the range [−1, 1]. Convolution layers can use a Leaky-Rectified-Linear-unit (leakyReLu) activation function, which pairs well with the [−1, 1] range of the modified input and output data. LeakyReLu uses a linear activation on any values greater than 0, and a modified (typically 0.3 times reduced) linear activation for values less than 0. The network can follow a structure of using Convolutional 1D filters to reduce the complexity of the original input. The reduced version of the original input can be manipulated by a series of fully connected (aka dense) layers. The secondary input—the one-hot encoded bone category—can be manipulated by a fully connected layer. The output of these two fully connected components can be concatenated together and processed through a final fully connected layer to produce an output of 16,384 values, which matches the 16,384 values of the modified input to the neural network. The convolution 1D layers of the neural network can scan or convolve a filter over a vector of values, multiplying each of the filter values by corresponding filter indices in the input data. The resulting output is then added together to produce a single value. The filter is continually shifted along the input data. A larger filter can be applied to input data to produce a reduced shape from the input data. A series of filters can also be applied to the input data to produce multiple outputs. Large filters with an increasingly large filterbank are used in the first portion of the neural network to produce reduced vector sizes, and multiple vectors are produced.

For example, the input could be a single vector of size 16,384 and the shape would be (16,384, 1). If two filters with size 2 are convolved over the input data then two vectors would result each of size 8,192 (filters would effectively reduce the vector shape by 2). This shape would be denoted as (8,192, 2). Generally, a larger filter size is used so that the total number of parameters shrinks over time and produces an encoding. For example, the multiple levels of convolution layers can produce an output of vector size 1 with 512 filters, meaning the output shape would be conformed from (16, 384, 1) to (1, 512).

In addition, the machine learning model could analyze the vertex matrix 139 received at block 203 to further improve the outputs of the output weightings matrix. The weightings matrix 136 may lack geometric information detailing the relative locations of individual vertices. As an extreme example, two sequentially numbered vertices could be located on opposite sides of the three-dimensional model 126 instead of being adjacent or nearly adjacent to each other. As a result, the machine learning model might not optimally weight vertices because it is unaware of their relative locations. Accordingly, some implementations could utilize the vertex matrix 139 to identify the relative location of the vertices of the adjusted weightings matrix generated at block 206.

In these implementations, the weightings service 113 could also preprocess the vertex matrix 139 to match the dimensions of the adjusted weightings matrix generated at block 206. The resulting adjusted vertex matrix would have the same number of rows as the weights matrix, with each row in the adjusted vertex matrix representing the approximately the same vertex as a respective row in the adjusted weightings matrix. Alternatively, the input of the weighting service 113 could avoid preprocess of the vertex matrix at 139 and not match the dimensions of the adjusted weightings matrix at block 206. In this alternative method, convolution layers could be used to preprocess the input to a standard latent space size regardless of the number of vertices supplied as input. This latent space matrix would then have the same dimensions as the latent space matrix produced by convolving the weights matrix. Using a variable input size prevents batch training of data, but does allow for a variable number of vertices as input.

Moving on to block 213, the weightings service 113 can then adjust the number of rows in the output weightings matrix to match the number of rows present in the first weightings matrix 136 received at block 203. This adjustment can be done using various approaches, such as the nearest neighbor algorithm. The adjustment performed at block 213 can be done so that the resulting weightings matrix has the same dimensions as the first weightings matrix 136 received at block 203. The result of the adjustment is a second weightings matrix 136.

Then, at block 216, the weightings service 113 sends the second weightings matrix 136 to the animation application 123 in response. This allows for the animation application 123 to use the second weightings matrix 136 to associate the wireframe mesh 133 to the skeleton 129, allowing for more realistic animations using the 3D model 126 without requiring a technical animator to adjust the weightings matrix 136 by hand.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts and sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts and sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 103.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
a computing device comprising a processor and a memory; and
machine-readable instructions stored in the memory that, when executed by the processor, cause the computing device to at least:
receive a first model weightings matrix;
adjust the number of rows in the first model weightings matrix to generate an adjusted model weightings matrix with a number of rows that matches an input number of rows for a machine-learning model, each column in the adjusted model weightings matrix representing a bone of a three-dimensional model and each row in the adjusted model weightings matrix representing a vertex of a mesh applied to the three-dimensional model;
apply the machine learning model to the adjusted model weightings matrix to generate an output model weightings matrix; and
generate a second model weightings matrix by adjusting the number of rows of the output model weightings matrix to match the number of rows of the first model weightings matrix.

2. The system of claim 1, wherein the machine-readable instructions that adjust the number of rows in the weightings matrix to generate the adjusted model weightings matrix further cause the computing device to apply a nearest neighbor algorithm to the first model weightings matrix to generate the adjusted model weightings matrix.

3. The system of claim 1, wherein each value in the first model weightings matrix, the adjusted model weightings matrix, the output model weightings matrix, and the second model weightings matrix represents an intensity of a relationship between a vertex of a three-dimensional polygonal mesh and one or more skeletal bones or joints.

4. The system of claim 1, wherein the machine-learning model comprises a convolutional neural network and the machine-readable instructions that apply the machine learning model to the adjusted model weightings matrix further cause the computing device to:

supply one column at a time of the adjusted model weightings matrix to the convolutional neural network; and individually process each column of the adjusted model weightings matrix with the convolutional neural network.

5. The system of claim 4, wherein the convolutional kernels of the convolutional neural network are one-dimensional convolutional kernels.

6. A method, comprising:

receiving this first model weightings matrix;

adjusting the number of rows in the first model weightings matrix to generate an adjusted model weightings matrix with a number of rows that matches an input number of rows for a machine-learning model, each row in the adjusted model weightings matrix representing a vertex of a mesh applied to a three-dimensional model;

applying the machine learning model to the adjusted model weightings matrix to generate an output polygonal mesh model weightings matrix; and generating a second polygonal mesh model weightings matrix by adjusting the number of rows of the machine learning model output weightings matrix to match the number of rows of the initial polygonal mesh model weightings matrix.

7. The method of claim 6, wherein adjusting the number of rows in the weightings matrix to generate the adjusted model weightings matrix further comprises applying a nearest neighbor algorithm to the first model weightings matrix to generate the adjusted model weightings matrix.

8. The method of claim 6, wherein each value in the first model weightings matrix, the adjusted model weightings matrix, the output model weightings matrix, and the second model weightings matrix represents an intensity of a relationship between a vertex of the three dimensional polygonal mesh and a bone or joint.

9. The method of claim 6, wherein the machine-learning model comprises a convolutional neural network and applying the machine learning model to the adjusted model weightings matrix further comprises:

supplying one column at a time of the adjusted model weightings matrix to the convolutional neural network; and individually processing each column of the adjusted model weightings matrix with the convolutional neural network.

10. The method of claim 9, wherein the convolutional kernels of the convolutional neural network are one-dimensional convolutional kernels.

11. A non-transitory, computer-readable medium, comprising machine-readable instructions that, when executed by a processor of a computing device, cause the computing device to at least:

receive a first model weightings matrix;

adjust the number of rows in the first model weightings matrix to generate an adjusted model weightings matrix with a number of rows that matches an input number of rows for a machine-learning model, each column in the adjusted model weightings matrix representing a bone of a three-dimensional model and each row in the adjusted model weightings matrix representing a vertex of a mesh applied to the three-dimensional model;

apply the machine learning model to the adjusted model weightings matrix to generate an output model weightings matrix; and generate a second model weightings matrix by adjusting the number of rows of the output model weightings matrix to match the number of rows of the first model weightings matrix.

12. The non-transitory, computer-readable medium of claim 11, wherein the machine-readable instructions that adjust the number of rows in the weightings matrix to generate the adjusted model weightings matrix further cause the computing device to apply a nearest neighbor algorithm to the first model weightings matrix to generate the adjusted model weightings matrix.

13. The non-transitory, computer-readable medium of claim 11, wherein each value in the first model weightings matrix, the adjusted model weightings matrix, the output model weightings matrix, and the second model weightings matrix represents an intensity of a relationship between a vertex of a three-dimensional polygonal mesh and a bone or joint.

14. The non-transitory, computer-readable medium of claim 11, wherein the machine-learning model comprises a convolutional neural network and the machine-readable instructions that apply the machine learning model to the adjusted model weightings matrix further cause the computing device to:

supply one column at a time of the adjusted model weightings matrix to the convolutional neural network; and individually process each column of the adjusted model weightings matrix with the convolutional neural network.

15. The non-transitory, computer-readable medium of claim 14, wherein the convolutional kernels of the convolutional neural network are one-dimensional convolutional kernels with variable sized filters.

* * * * *